Dec. 13, 1960 J. F. BRINSTER ET AL 2,964,240
PLOTTER
Filed Aug. 28, 1953 2 Sheets-Sheet 1
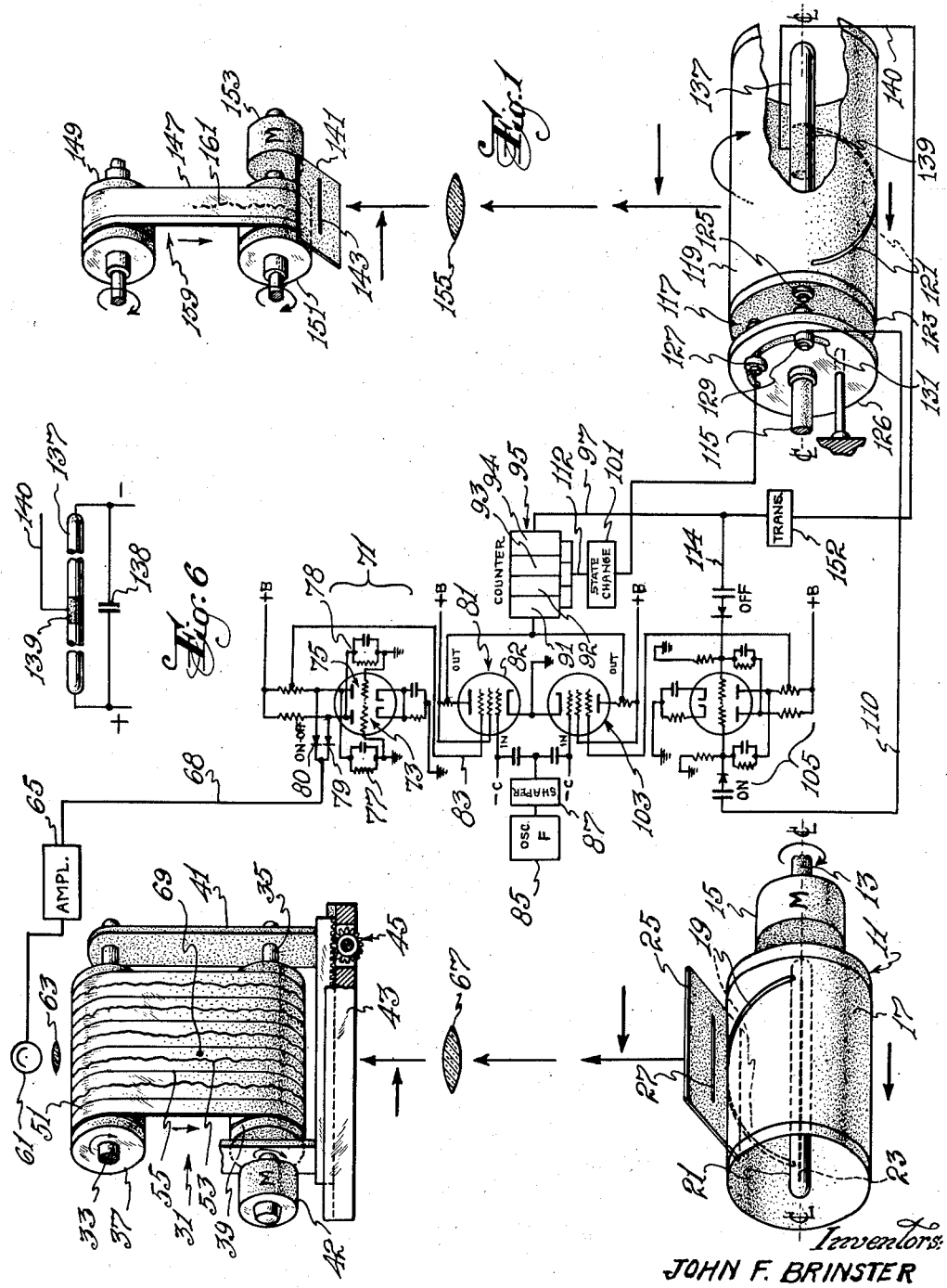
Inventors:
JOHN F. BRINSTER
ERWIN DONATH
By Ralph K. Bonell Agent

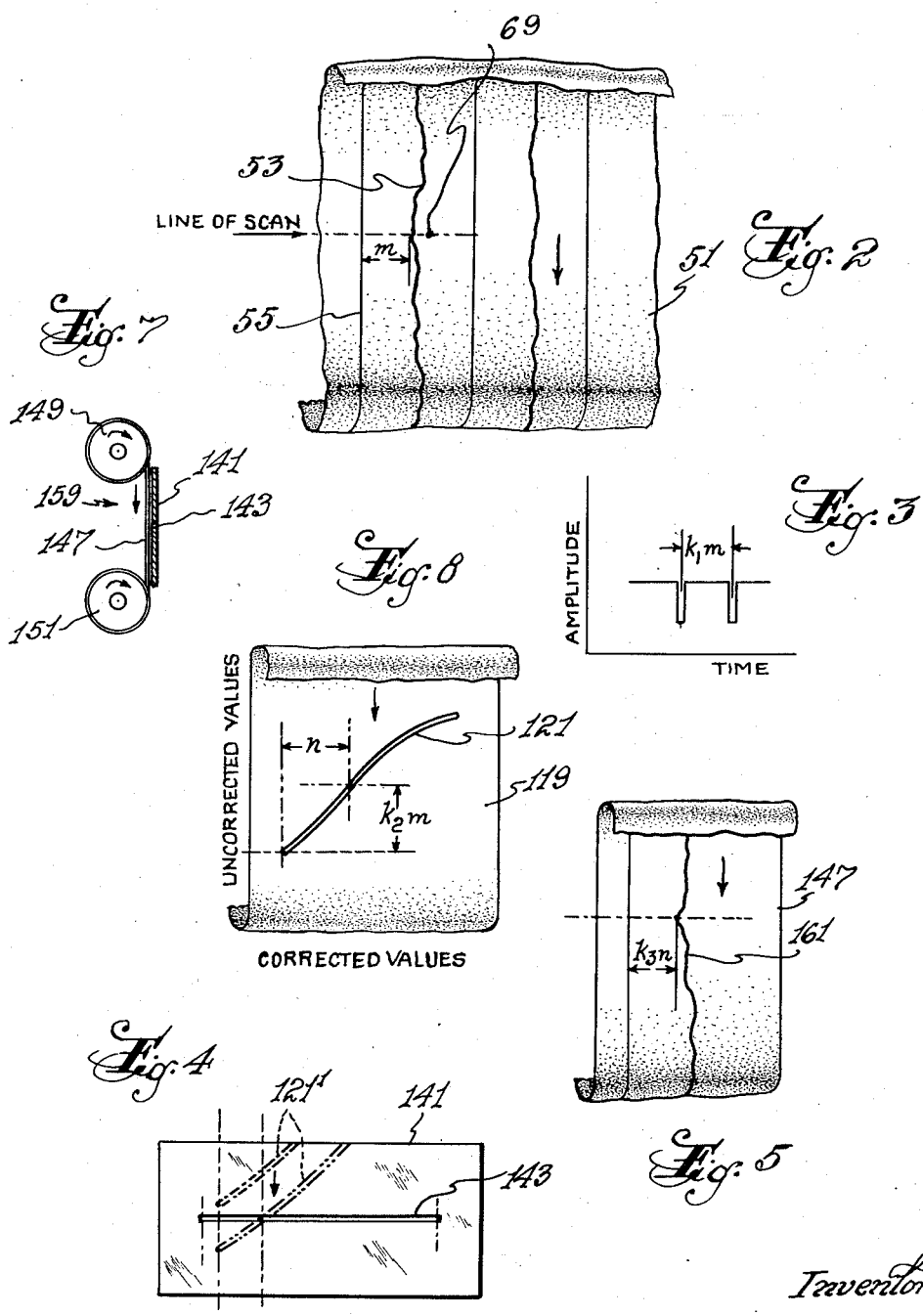

United States Patent Office 2,964,240
Patented Dec. 13, 1960

2,964,240

PLOTTER

John F. Brinster and Erwin Donath, Princeton, N.J., assignors, by mesne assignments, to Electro-Mechanical Research, Inc., Sarasota, Fla., a corporation of Connecticut Filed Aug. 28, 1953, Ser. No. 377,092

19 Claims. (Cl. 235—61.6)

This invention relates, generally, to recording apparatus and it refers more particularly to a method of and means for rapidly reproducing a graphical record, especially in a modified form.

In technical investigations where the variations of a measured quantity are recorded in the form of a graph by appropriate recording apparatus, distortions of the value of the variable frequently occur in one or more steps of the recording process. For example, a common source of distortion is the pick-up or transducer by means of which the measured quantity is changed into some other form better adapted to recording. Instruments of this class often have an operating characteristic which, to a certain extent or in certain regions, is non-linear. Under such conditions it is necessary, in order to present a true picture of the variations of the measured quantity or "measurand," to "reduce" the uncorrected or "raw" data, that is, to apply corrections in accordance with known calibrations of the instruments involved in the recording or other procedures and to plot a new graph from these corrected data.

Heretofore the process of data reduction has largely been carried out manually and has proved to be time-consuming, tedious and subject to error, particularly where large masses of data are involved as, for example, in guided missile and aerodynamic investigations.

The present invention provides a method of and means for rapidly reducing raw data, displayed as a graph, such as an oscillographic film record, in accordance with non-linear corrections or other pre-established relationships likewise displayed in graphical form, such as an instrument calibration curve. An output graph of reduced data is automatically produced, point by point, at a rapid rate, for instance, sixty points or more a second, by way of illustration of practical operating speeds. To accomplish this, photo-electric means are employed to scan the raw data graph in sequence at closely spaced points therealong and thus develop, for each scanning operation, an electrical signal proportional to the value of the measurand at the scanned point, as given by the ordinate of the point. The signal at one stage of the operation appears in digital form and the foregoing components of the invention constitute means for rapidly digitalizing graphical data.

A point on the calibration graph or other display having a co-ordinate along the axis of uncorrected values of the measurand proportional to the magnitude of the described signal is then automatically selected and a measure of the corresponding co-ordinate along the axis of corrected values of the measurand utilized to determine the ordinate of a photographically-printed point on an output graph of reduced data. In this manner the digitalized data is turned back, with modifications, into graphical form. Repetition of the foregoing sequence of events, carried out by electronic means at the above mentioned rates, results in the plotting of a complete reduced data graph in a fraction of the time required for manual processing of the data and with increased probability of the accuracy of the result.

In addition to the above-described manner of operation the apparatus of the invention may be used for the rapid reproduction of a graph in substantially unmodified form, or modified as to scale, only, if for a non-linear calibration graph a display of a linear relationship between dependent and independent variables is substituted.

It is an object of the invention to provide automatic means for the rapid reproduction of a graphical record.

It is another object to provide automatic means for plotting a graph of modified data in accordance with information derived jointly from a graph of unmodified data and means defining an established relationship between modified and unmodified data.

It is another object to provide automatic means for plotting a graph in accordance with information derived jointly from a plurality of other graphs.

It is another object to provide automatic means for plotting a graph in accordance with information derived jointly from digital and graphical data.

It is another object to provide improved automatic means for the rapid digitalization of graphical data.

It is another object to provide automatic means for the rapid display of digital data in graphical form.

It is a further object to provide an improved method or methods of correcting graphical data.

Other objects and advantages of the invention will be apparent upon consideration of the following specification and the appended drawings relating thereto, in which:

Fig. 1 is a combination perspective drawing and circuit diagram illustrating one embodiment of the invention;

Fig. 2 is an enlarged view of a portion of a film bearing multi-channel graphs of raw data;

Fig. 3 is a graph showing the time relationship of a pair of spaced electrical impulses appearing in the system;

Fig. 4 is a front elevation of a light mask of Fig. 1, showing the projection of a calibration curve thereon;

Fig. 5 is an enlarged view of a portion of a plotted graph of reduced data;

Fig. 6 is a circuit diagram for a flash lamp;

Fig. 7 is an end elevation of a detail of the recording apparatus of the invention; and Fig. 8 shows a portion of a film bearing a calibration graph.

Referring, now, more particularly to Fig. 1, there is shown a cylindrical support or drum 11 of transparent material, such as glass or a plastic composition, mounted on shaft 13 for rotation therewith. Shaft 13, as illustrated, is directly driven by motor 15, which may be a synchronous A.C. motor to provide a constant known speed of rotation.

Drum 11 bears a thin sheet of film 17 wrapped about and in intimate contact with the outer surface thereof, said film in the illustrated form being generally opaque except for a narrow transparent trace or slit 19 which, in the curved condition of the film, takes the form of a helix having a pitch approximately twice the axial dimension of the film and an angular extent of approximately 180 degrees. The width of slit 19 may be of the order of a few thousandths of an inch and the slit preferably is produced by a photographic process, using sensitized material for film 17.

Positioned within drum 11 is a tubular electric lamp 21 having an elongated filament 23 extending along the axis of the drum, said lamp constituting substantially a line source of illumination. External to drum 11 but closely adjacent thereto is positioned a generally opaque mask 25 having a narrow, linear, transparent trace or slit 27 parallel to the axis of the drum. For clarity of illustration in Fig. 1 mask 25 is shown displaced from its location adjacent drum 11. As in the case of helical slit 19, linear slit 27 may be formed photographically and may be of the order of a few thousandths of an inch in width, the principal function of each slit being to provide a light aperture having as small an extent in one dimension as is optically practical.

Remote from drum 11 is raw data film drive 31, comprising parallel shafts 33 and 35 respectively mounting rollers 37 and 39, both shafts being journaled on a carriage 41 and being in parallel alignment with shaft 13. Shaft 39 is driven, as by a synchronous motor 42, for transport of the film. Carriage 41 is mounted in guides 43 for adjustable displacement in the direction of the axes of shafts 33 and 35 by rack and pinion means 45.

The raw data to be reduced is illustrated in Figs. 1 and 2 as recorded on a photographic film 51, such as an oscillographic film, in the form of multiple traces or graphs corresponding, respectively, to a plurality of data channels. Each channel record comprises a data trace, as trace 53, and an associated reference trace, as trace 55, the latter being a plot of zero values in successive point-by-point correspondence with the plotted data. Trace 55 may vary in position along its length in accordance with changing zero conditions during the making of a record and is recorded along with the recording of the data trace. The effective ordinates of trace 53 are measured transversely of film 51 according to the spacing of traces 55 and 53 in the direction of the axis of ordinates. In the following description film 51 will be considered to be generally transparent and the traces thereon opaque but a similar contrast in light transmitting properties may be obtained by reversal of the foregoing conditions.

Film 51 is mounted on rollers 37 and 39 for transfer therebetween, the travel of the film being from roller 37 to roller 39 with the portion of the film intermediate the rollers lying substantially in a plane. On the side of film 51 remote from light source 21 there is located a photo-tube or pick-up 61 with intermediate optical means, illustrated as lens 63 for focusing light transmitted through the film onto said tube. With photo-tube 61 there may be associated an amplifier 65 for amplifying and/or shaping the output of the tube in known manner.

The operation of the foregoing portion of the exemplary embodiment of the invention will now be described. As drum 11 is rotated by motor 15 in the direction of the arrow, light derived from lamp 21 as a source illuminates and is transmitted through an area in the plane of linear slit 27 defined by the intersection or projected intersection, of said slit and helical slit 19, during one half of a revolution of drum 11, the beam being blanked off by the opacity of film 17 during the succeeding half revolution. With the helix formed as shown and with the indicated direction of drive this intersection of the two slits, constituting a very small aperture, travels intermittently along slit 27 from right to left, as seen in Fig. 1, at a constant linear velocity as drum 11 rotates at a constant angular velocity, the travel time for one excursion of the aperture corresponding approximately to the period of a half revolution of the drum. An optical system, illustrated as lens 67, images the illuminated aperture on film 51, preferably in reduced ratio, the result being a minute, movable, illuminated spot 69, termed a "flying spot," formed in the plane of film 51 by the light rays converged by lens 67. Spot 69 may have a maximum dimension, by way of example, of the order of two or three thousandths of an inch and an amplitude of travel, when film 51 is suitably positioned relative thereto, slightly more than sufficient to sweep across the two traces comprised by each channel record, as reference trace 55 and data trace 53, at the point of widest separation thereof, said amplitude being determined by the axial length of helix 27 and the optical reduction introduced by lens 67. The direction of travel of spot 69 is from left to right, as seen in Fig. 1. The means controlling the travel of spot 69 define a line of scan corresponding in direction to the axis of ordinates of trace 53. The selection of a particular data channel to be scanned by spot 69 and the adjustment of the limits of travel of the spot relative to the two traces of said channel is accomplished through transverse positioning of carriage 41 by rack and pinion means 45.

As long as spot 69 appears in a transparent portion of film 51, an image thereof is formed by lens 63 on the sensitive surface of photo-tube 61, thereby exciting the tube to produce a substantially constant electrical output. As spot 69 in its travel crosses opaque traces 53 and 55 (Fig. 2), light therefrom ceases to reach the photo-tube and the tube output is momentarily interrupted or reduced. Since a downward modulation of the steady tube output may be considered as constituting a negative electrical impulse, during each scanning excursion of spot 69 across traces 53 and 55 there is generated a pair of negative impulses, each of short duration, separated in time, due to the constant rate of travel of spot 69, by an interval $k_1m$ (Fig. 3) proportional to the effective uncorrected or unmodified datum value $m$ (Fig. 2) of the measurand at the scanned point and hence constituting an electrical signal proportional to said unmodified datum value. Gating means, here omitted for simplicity of illustration, may be employed to limit noise when no impulses are being generated. It is recognized that a slight error may be introduced by the longitudinal travel of film 51 during the progression of spot 69 from trace 55 to trace 53 but as the scanning speed of the spot can, in practice, be made much greater than the film feed, this error is reducible to a negligible quantity. The modulation of the output of photo-tube 61 to produce a pair of electrical impulses spaced in time in accordance with the numerical value of the measurand, will be recognized as pulse-position modulation, of frequent occurrence in the computer art, wherein the value of a signal is given by the time interval between the occurrences of the two component impulses thereof.

The next section of the description deals with the transformation of the information carried by the pulse-position modulated wave, representing the uncorrected or unmodified value of the measurand, to a digital form and its storage, preferably as a binary number. The means shown and described herein for effecting this transformation and subsequent data storage constitute a modification of the means disclosed in the co-pending application of Brinster, Hill, and Donath, Serial No. 321,704, filed November 20, 1952, now Patent No. 2,853,235, entitled, "Method of and Circuit for Counting Impulses," assigned to the assignees of the present invention. Where portions of the apparatus of the present invention may, in use, be substantially identical with corresponding portions of the apparatus disclosed in said application, they are shown in the drawings of the present application in block-diagram form and described with reference to their functions, only.

Referring further to Fig. 1, the output of photo-tube 61, optionally amplified and/or modified by amplifier 65, is applied to gate control circuit 71 by way of lead 68, return by way of a common circuit "ground" connection being generally understood in this and other described circuits, unless otherwise shown or described.

Circuit 71 which, in its present application, will be referred to as a "single-ended" gate control, serves to control the opening and closing of electronic gate 81. Gate control 71 is a bistable circuit or flip-flop of known type comprising triodes 73 and 75 with grid-plate cross-coupling circuits 77, 78 and input rectifiers 79, 80, polarized as shown. The useful operating feature of such a circuit is that successive negative trigger impulses applied to the input, as by way of lead 68, cause the alternate occurrence of the two operating states of the circuit, respectively characterized by conduction in one triode or the other of the pair, the opposite triode being cut off. When triode 73 conducts and triode 75 is cut off a relatively high positive potential is applied to lead 83 whereas conduction in triode 75 reduces said potential.

Gate 81 comprises pentode 82 normally biased to cut-off by the suitably negative potential of the No. 1 grid (from the cathode) thereof when the positive potential of lead 83 is low. In this condition transmission is prevented between the "In" and "Out" leads of the gate. A relatively high positive potential applied to the No. 3 grid by way of lead 83 opens the gate and holds it open while said potential persists, this positive potential in the present instance being supplied by gate control 71 in the described manner.

When gate 81 is open, oscillations or impulses pass from constant frequency oscillator 85, at the operating frequency F thereof, to a multi-stage binary counter 95. If desired, intermediate shaping means 87 of suitable conventional design may be provided. Counter 95, shown in block form as comprising four counting stages 91, 92, 93, 94, preferably is of the type described in said application Serial No. 321,704, the novel features of which that are of advantage in the operation of the present application being referred to later.

In the operation of the just-described portion of the invention, the pulse-position data resulting from the scanning of raw data film 51 is digitalized as follows: Assuming a single pair of impulses whose spacing is a measure of one value of the raw or unmodified data, the first of these when applied to lead 68 causes gate control 71 to open gate 81. The appearance of the second impulse results in the closing of the gate. The interval during which gate 81 remains open, therefore, is proportional to the spacing of the two impulses, in time, and since oscillator 85 operates at a constant frequency, the count of the sequence of impulses reaching counter 95 therefrom during said interval, likewise is proportional to said spacing. Originally, the spacing of the paired impulses was determined by the spacing of traces 55 and 53 on film 51 at a scanned location and it is therefore apparent that the count of impulses from oscillator 85 registered by counter 95 as well as the pulse-position signal, above referred to, is an electrical signal which is a measure of the uncorrected value of the measurand at said location.

As noted, a preferred form of binary counter for use in the location of counter 95 has been described in application Serial No. 321,704, now Patent No. 2,853,235. One feature thereof is that the counter is cyclically operable in that when its counting capacity is reached the counter returns to a predetermined count, which may be zero, upon the occurrence of the next unit input. Simultaneously, an output impulse is supplied, as to lead 97. Another feature is that under the influence of a single negative trigger impulse, such as may be supplied by circuit 101 to lead 112, the digits in all places of the binary number then registered by the counter are simultaneously reversed. Circuit 101 is a means for shaping an impulse for use as such a trigger, it being herein termed a "State Change Circuit" because of its role in the reversal of the operating states of the counting stages of counter 95.

In operation, if counter 95 before state change registered the binary number 0101, by way of example, after said change the number would be 1010, these being the numbers five and ten respectively. The number registered after state change is said to be the "complement" of the original number with respect to the counting capacity of the counter, the "complement" being defined as the difference between the capacity of the counter, in the present instance fifteen, and the original number.

In addition to the path through gate 81, impulses can be transmitted from oscillator 85 to counter 95 through a second and similar gate 103 when operated to an open condition by gate control 105. The last named circuit is a bistable circuit herein termed a "double-ended" gate control, the designation "double-ended" being used to indicate that reversal of state is brought about by "on" and "off" impulses applied to separate "On" and "Off" leads, respectively, instead of in sequence to a common control lead as in the case of "single-ended" gate control 71. The manner of controlling a gate otherwise is the same in either case.

The portion of the disclosed apparatus more immediately connected with the plotting of the output graph, that is the curve of reduced data, will now be described. Shaft 115, preferably driven by motor 15 at the same speed as shaft 13 or in fixed relationship thereto, mounts for rotation therewith a drum 117 of transparent material. Shown in intimate contact with the external surface of drum 117, but adapted also for internal mounting, is a film 119 preferably generally opaque except for a narrow transparent trace or slit 121, a few thousandths of an inch in width, which is a graph of the relationship of raw and reduced data or which may be drawn in accordance with other operations to be performed upon unmodified data, and is prepared in this form for particular use with the present apparatus, thus registering and storing corresponding values of modified and unmodified data according to a pre-established relationship. For example, this graph may represent the calibration of a pick-up wherein pick-up response measured, generally according to a linear scale, along an axis of uncorrected values of the measurand, is plotted against pick-up input, measured along an axis of true or corrected values of the measurand. Film 119 is mounted on drum 117 so that the axis of uncorrected values of graph 121 lies around the periphery of the drum in the direction of film travel while the axis of corrected values lies in the direction of the drum axis, transversely of the film travel. The angular extent of the graph about the drum preferably is approximately 180 degrees and its position is approximately 180 degrees away from that of helical trace 19 of film 17.

Drum 117 is provided with an end hub 123 in which is inserted a plug 125 of permanent magnet material projecting slightly beyond the surface of the hub. A stationary support 126 through which shaft 115 passes mounts magnets 127 and 129. The respective cores of magnets 127 and 129, having individual windings thereon, are positioned with their right-hand polar portions closely adjacent the plane in which the projecting face of plug 125 rotates, so that passage of the plug past the magnets, as drum 117 rotates, generates electrical impulses in said windings by magnetic induction. The combination of means 125, 127, 129 serves to supply recurrent impulses synchronized with selected phases of the rotation of drum 117 and is by way of illustration of a commutator which may be replaced by other commutating means, such as a switch and associated source of voltage.

The winding of magnet 127 is connected to the input of state change circuit 101 by way of lead 128, while the winding of magnet 129 is connected to the "On" lead of gate control 105 by way of lead 130. Magnets 127 and 129 preferably are mounted for individual adjustment as to angular position about the periphery of drum 117 by attachment to arcuately slotted yoke 131.

A high-intensity gaseous vapor flash lamp 137 having a straight tubular envelope is located within drum 117 along the axis thereof as a source of light for printing the output record. In addition to a high peak of luminous intensity, lamp 137 is characterized by the extremely short duration of said peak, this duration being of the order of a few micro-seconds. The flashing of lamp 137 is accomplished by maintaining a constant voltage, just under the flashing voltage of the lamp, across a high capacity condenser 138 (Fig. 6) connected to the principal electrodes of the lamp and, at the instant a flash is called for, applying a trigger voltage to auxiliary electrode 139 by way of step-up transformer 152 and lead 140 thereby initiating ionization of the gas in the lamp and allowing condenser 138 to discharge through the lamp.

In the printing of the output record, light from lamp 137 is masked both by generally opaque calibration film 119 and generally opaque mask 141, the latter comprising a narrow transparent linear trace or slit 143, preferably not more than two or three thousandths of an inch in width which may be produced photographically as in the case of similar slits previously referred to. Mask 141 is located closely adjacent or in actual contact with sensitized recording paper 147 at a plane portion thereof intermediate rollers 149 and 151 of output paper drive 159 which are in parallel alignment with drum 117 and on which the paper is mounted for travel therebetween. In Fig. 1 the mask is displaced from its true position relative to paper 147 for clarity of illustration, the actual relationship more nearly being shown in Fig. 7. Travel of paper 147 is synchronized with travel of raw data film 51 by the use of a synchronous motor 153 fed from the same supply as motor 42. Motors 153 and 142 are of the geared type or may be geared down by external means not shown. The intersection of trace 143 on mask 141 and the image 121 of calibration trace 121' projected on mask 141 by an optical system illustrated as lens 155 constitutes a minute aperture, substantially a point, through which light from lamp 137 reaches paper 147 to print a developable image of a point thereon. The longitudinal extent of slit 143 is transverse of the travel of paper 147 in the direction of the axis of ordinates of the plotted output graph. A portion of the projection 121' of calibration curve 121, in two positions thereof, is shown in Fig. 4. The image reversal introduced by lens 155 is taken into consideration, as are similar reversals elsewhere.

The operation of that portion of the apparatus concerned with read-out of the count stored by counter 95 and the printing of points on the output graph of reduced data will now be traced. Upon passage of magnetic plug 125 past magnet 127 an impulse is generated by magnetic induction in the winding of said magnet which, applied to state change circuit 101, causes an output trigger therefrom to reach counter 95 by way of lead 112 and produce a change of state of all counting stages. The complement of the original count stored before state change is then registered by the counter. The subsequent passage of plug 125 past magnet 129 generates an impulse in the winding of said magnet which, applied to "On" lead 110 of gate control 105, causes said control to open gate 103 and permit oscillations or impulses at the constant frequency F thereof to pass from oscillator 85 to counter 95 and to be registered thereby as an addition to the previously stored complement of the original count. Upon the counter reaching its counting capacity, the next unit input impulse results in the resetting of the counter and the application of an output impulse therefrom to "Off" lead 114 of gate control 105, by way of lead 97. This last impulse causes gate control 105 to close gate 103 and stop the flow of impulses to counter 95. The open period of gate 103 thus measures the time interval of read-out.

Since the number registered by counter 95 before the opening of gate 103 was the complement of the original count, the additional number of impulses required to operate the counter to capacity is equal to said original count. The one additional impulse required to produce an output from the counter and close gate 103 after capacity is reached is, in most practical cases where high capacity counters are used, negligible in comparison with the number stored by the counter. However, by further circuit refinements, disclosed in said application Serial No. 321,704, but not shown herein, compensation may be made for this additional impulse in the process of reading out the count from the counter.

The passage of plug 125 past magnet 127 as drum 117 rotates, and thereby the opening of gate 103, is synchronized, as by adjustment of the position of magnet 127 along slotted yoke 131 with the passage of a reference point on the projected image of film 119 past linear slit 143 of mask 141, this reference point being a selected and adjustable origin of co-ordinates for the projected image 121' of calibration graph 121 (Fig. 4) in the plane of mask 141. Since drum 117 rotates at a constant speed, and since oscillator 85 operates at a constant frequency, subsequent travel of projected calibration graph 121' relative to slit 143 during the time interval that gate 103 remains open, that is, during the read-out interval, is proportional to the number of impulses supplied to counter 95 by oscillator 85 during this read-out interval and hence proportional to the original count of impulses stored by the counter before the initiation of read-out. It follows that the point on projected calibration graph 121' defined by the intersection of linear trace 143 therewith has, at the instant gate 103 is closed upon the completion of read-out, a co-ordinate $k_2 m$ (Fig. 8), along the axis of uncorrected measured values proportional to the original point count of impulses stored by counter 95 and therefore, referring back to raw data film 51, proportional to the spacing $m$ (Fig. 2) of traces 55 and 53 at the scanned point under consideration. It will be apparent that the time interval during which gate 103 is open and the effective displacement of graph 121' relative to trace 141 occurs, likewise is proportional to said spacing.

The corresponding co-ordinate $n$ (Fig. 4), of said intersection measured along the axis of corrected measurand values is proportional to and a measure of the corrected or modified value of the measurand at the scanned point and may be considered a modified version of the count or signal read-out of counter 95. Since a linear optical transformation by lens 155 may be assumed, the co-ordinates of points on projected trace 121' are respectively proportional to the co-ordinates of corresponding points on the object trace, calibration graph 121.

At the conclusion of read-out, the impulse supplied to output lead 97 upon the counter reaching and exceeding by one unit its counting capacity, in addition to being supplied to "Off" lead 114 of gate control 105 for the purpose of closing gate 103, also is supplied to step-up transformer 152 and lead 140 to trigger flash lamp 137. The portion of the light resulting from the flash which illuminates and passes through the aperture formed by the intersection of trace 143 and projected trace 121' prints a point of very small size on sensitized paper 147, to be made visible by later photographic development. This is the sought for point on reduced data graph 161 having an ordinate $k_3 n$ measured from the origin of said graph proportional to the co-ordinate $n$ of the trace intersection above referred to, along the axis of corrected values of the calibration graph, the distance $n$ or a distance proportional thereto being a measure of the corrected or modified datum value under consideration. $k_1$ (Fig. 3), $k_2$ (Fig. 4) and $k_3$ (Fig. 5) are constants of proportionality which take into account scale and optical factors, gearing, and like design considerations. A method of introducing an adjustable scale or multiplying factor in the process of reading out a count stored by a counter which may be utilized in connection with the present apparatus, is disclosed in application Serial No. 321,704.

Initial lateral adjustment of paper 147 relative to film 119 to secure the registration of output graph 161 in proper relation to a reference on said paper may be provided for by means not shown. The phasing of the operation of scanning the raw data and the printing of a point of reduced data, as noted, is governed by the relative position of helical trace 19 and calibration graph 121, these two curves being so located as to be in active operation during alternate half-revolutions respectively, of drum 11, or drum 119.

The detailed operation of an exemplary embodiment of the invention having for convenience been described herein by sections, a brief summary and recapitulation of the operation as a whole will now be given. Assuming that a transparent film 51 bearing one or more black-line graphs of raw data together with associated reference traces, as the combination of traces 53 and 55, is suitably mounted on film-reader rollers 37 and 39 and the travel of flying spot 69 adjusted relative thereto and that other portions of the apparatus are in operating condition, the rotation of drum 11 causes spot 69 to scan traces 55 and 53 intermittently while the longitudinal travel of film 51 causes the scanned location to progress along the two traces so that the entire extent of said traces eventually is covered. Each excursion of spot 69 results in the registration and storage by counter 95 of a count of electrical impulses proportional to the spacing of traces 55 and 53 along the line of scan, that is, proportional to the uncorrected indicated value of the measurand at the scanned location. This occurs during one half-revolution of drum 11. During the succeeding half-revolution of drums 11 and 117 the stored count is read out of the counter. In the time interval occupied by read-out the projected intersection of linear trace 141 and calibration graph 121 (in its projected version 121') moves at a uniform rate, measured in the direction of the axis of uncorrected values, to a point on the latter trace having a co-ordinate along said axis of uncorrected values proportional to the count. When this position is reached the flashing of lamp 137 prints an image of the intersection of the two traces, substantially a point, in a position on the output graph of reduced data such that the ordinate of the printed point on said graph is equal to the co-ordinate of said trace intersection along the axis of corrected values of the calibration graph. The longitudinal travel of output record paper 137 being synchronized with the longitudinal travel input data film 51, the point-by-point printing of reduced data graph 161 proceeds in correspondence with the advance of the scan along raw data graph 53.

The limits of the invention are not defined by the description given herein of exemplary embodiments thereof but solely by the appended claims.

We claim:

1. In automatic apparatus for plotting a graph of modified data in accordance with information derived jointly from unmodified data and an established relationship between modified and unmodified data the combination of means displaying a first graph of unmodified data, means displaying a second graph defining an established relationship between modified and unmodified data, automatic means for sensing a point on said second graph corresponding in unmodified datum value to a selected point on said first graph, means for plotting a third graph and means controlling said last means in accordance with the modified value of said sensed point.

2. In automatic apparatus for plotting a graph of modified data in accordance with information derived jointly from unmodified data and an established relationship between modified and unmodified data the combination of means displaying a graph of unmodified data, means for deriving a signal proportional to the datum value of a point on said graph, means displaying a graph defining an established relationship between modified and unmodified data, automatic means for sensing a point on said second graph having an unmodified value proportional to said signal, point-by-point graph plotting means, and means determining a co-ordinate of a point plotted by said last means in accordance with the modified value of said sensed point.

3. In data reduction apparatus the combination of means bearing a display of variable raw data in the form of a continuous graph together with a zero reference trace therefor, means including a photo-electric pick-up for scanning across said two traces at a constant rate to develop a pulse-position signal proportional to the datum value of a point at a selected location therealong, means for converting said signal to digital form, means displaying the relationship of raw and reduced data in the form of a second graph having an origin, means measuring the distance from said origin along the axis of raw data to define a point on said graph having a raw datum value proportional to said signal, and photographic means for plotting a graph of reduced data including means determining a co-ordinate of a point plotted thereby in accordance with the reduced datum value of said point on said second graph.

4. In data reduction apparatus in combination an elongated movable base member bearing a pair of normally spaced longitudinally extending traces having light transmitting properties different from said base, means for imparting a continuous longitudinal motion to said base, means providing a flying spot intermittently scanning across said traces at a constant rate, means including a photo-tube co-operative therewith for developing electrical signals valued respectively in accordance with the spacing of said traces along the line of scan at successively scanned locations, means for storing said signals in sequence, read-out means for individually reading out said signals, means for obtaining a version of a signal thus read out incorporating an established relationship between raw and reduced data, plotting means comprising a movable record member together with means for displacing said record member synchronously with said base member, and means controlling the position of a point plotted by said plotting means in accordance with said version of said signal.

5. Apparatus as claimed in claim 4 wherein the signals valued in accordance with the spacing of said traces are materialized in digital form each comprising a sequence of electrical impulses having a count proportional to said spacing.

6. In automatic apparatus for the reproduction of a graphical record the combination of means displaying a record to be reproduced, means for obtaining an electrical signal in digital form proportional to the effective datum value of a point on said graph, storage means therefor comprising a counter, means for reading out in digital form a signal stored by said counter, a plotter, having means determining a co-ordinate of a point plotted thereby, and means controlling said last means in accordance with a version of said signal read out of said counter.

7. In automatic apparatus for the reproduction of a graphical record the combination of a support displaying a graph to be reproduced and an associated trace of zero values thereof, said two traces having common co-ordinate axes, scanning means including a photo-electric pick-up for scanning at a constant rate across said two traces in the direction of one of said axes to develop a pulse-position signal valued in accordance with the spacing thereof along the line of scan, conversion means for digitalizing said signal including a constant frequency oscillator and means for obtaining therefrom a sequence of impulses having a count proportional to the value of said signal, a graph plotter including means determining a co-ordinate of a point plotted thereby, and means for controlling said last means in accordance with a version of said signal.

8. In apparatus for digitalizing variable data displayed in graphical form the combination of a base member displaying a graph trace of variable data in point-by-point association in a predetermined direction with a trace of zero values pertaining thereto, a flying spot scan traversing said two traces in said direction, a photo-electric pick-up co-operative therewith and responsive both to scanning of said graph trace and said zero values trace for developing a pulse-position signal valued in accordance with the spacing of said two traces in said direction, an oscillator, circuit means governing the output of said oscillator to provide a sequence of electrical impulses having a count proportional to the value of said signal and means controlled by said impulses for generating a further impulse for each sequence having a time position dependent upon the number of impulses in a sequence.

9. In apparatus for digitalizing variable data displayed in graphical form the combination of a base member displaying a graph trace of variable data in point-by-point association in a predetermined direction with a trace of zero values pertaining thereto, a flying spot scan traversing said two traces in said direction, a photoelectric pick-up co-operative therewith and responsive both to scanning of said graph trace and said zero values trace for developing a pulse-position signal valued in accordance with the spacing of said two traces in said direction, a constant frequency oscillator, circuit means governing the output of said oscillator to provide a sequence of uniformly spaced electrical impulses having a count proportional to the value of said signal, storage means including a counter for storing said count and means for reading out a count stored in said counter, said counter including means for generating a further impulse upon completion of read out of a count.

10. Apparatus as claim in claim 9 wherein said circuit means includes an electronic gate intermediate said oscillator and counter and means governing the open period thereof in accordance with the time value of said signal, to control the count of impulses reaching said counter.

11. In apparatus for plotting a graph of the values of variable digital data the combination of a source of a sequence of impulses whose count represents a datum value, means for storing said count of a sequence of impulses, means for reading in and reading out a count thereto and therefrom, means measuring a time interval having a value proportional to a count read out of said storage means, automatically operable means for developing a displacement having a value in pre-established relationship to the value of said interval, graph plotting means, and means controlling the position of a point plotted thereby in accordance with said displacement.

12. In apparatus for plotting a graph incorporating sequentially available values of variable data the combination of a pair of relatively movable transparent traces each having an opaque background, the effective intersection of said traces defining a light aperture, means for relatively displacing said traces to position said aperture, a flash lamp supplying a high-intensity flash of short duration disposed to transmit light through said aperture, light-sensitive record means disposed to receive light transmitted through said aperture for printing a point thereon positioned in accordance with the position of said aperture, means measuring the distance of said aperture from a reference, and means for flashing said lamp responsive to a measured distance corresponding to a selected value of the data.

13. In apparatus for plotting a graph in accordance with information derived jointly from digital and graphical data the combination of a source of digital data including a storage counter and means for reading out a count stored thereby as a like count of a sequence of electrical impulses, a graph displaying an established relationship between an independent and a dependent variable, automatic means for sensing a point on said last graph having an independent variable value proportional to said count, means measuring the dependent variable value of said point, a photographic point-by-point graph plotter, and means controlling the ordinate of a point plotted thereby in accordance with said measured value.

14. In automatic apparatus for plotting a graph the combination of a transparent cylindrical support, means for rotating said support about the axis thereof, means measuring rotary displacement thereof, a generally opaque film bearing a transparent trace mounted about said cylinder, a flash lamp within said cylinder for illuminating said trace, a generally opaque mask bearing a second transparent trace intersecting said first trace in projection, an elongated light sensitive record base, means for transporting said base longitudinally, and means controlled by said measured rotary displacement for flashing said lamp intermittently to record on said base the position of said intersection.

15. In automatic apparatus for plotting a graph of modified data in accordance with information derived jointly from unmodified data and an established relationship between modified and unmodified data, the combination of means displaying a first graph of unmodified data, means displaying a second graph defining predetermined fixed values of modified data for predetermined values of unmodified data, first means controlled by said first graph in accordance with the values of the unmodified data of said first graph, and means for plotting a third graph jointly controlled by said first means and said second graph for plotting the modified values of data corresponding to the unmodified values of data of said first graph.

16. In automatic apparatus for plotting a graph of modified data in accordance with information derived jointly from unmodified data and an established relationship between modified and unmodified data the combination of means displaying a graph of unmodified data, means for deriving a signal proportional to the datum value of a point on said graph, means displaying a graph defining predetermined fixed values of modified data for predetermined values of unmodified data, automatic means responsive to said signal for sensing a point on said second graph having an unmodified value proportional to said signal, and point-by-point graph plotting means controlled by said automatic means for plotting the modified value of said sensed point.

17. Apparatus for digitalizing variable data comprising means displaying a reference trace and a trace corresponding to the values of said data measured from said reference trace, means for scanning said traces transversely thereto and for developing a pulse-position signal valued in accordance with the spacing between said traces in the direction of scanning means connected to said scanning means and responsive to said signal for generating a sequence of electrical impulses having a count proportional to the value of said signal and means controlled by said impulses for generating a further impulse for each sequence having a time position dependent upon the number of impulses in a sequence.

18. Apparatus for plotting variable data in modified form comprising means displaying a reference trace and a trace corresponding to the values of said data measured from said reference trace, means for scanning said traces transversely thereto and for developing a pulse-position signal valued in accordance with the spacing between said traces in the direction of scanning, means connected to said scanning means and responsive to said signal for generating a sequence of electrical impulses having a count proportional to the value of said signal and graph plotting means comprising recording means movable along a predetermined adjustable path and means connected to said generating means and responsive to said impulses for controlling said recording means.

19. Apparatus for plotting a graph of digitalized data existing as successive sequences of spaced electrical impulses comprising means for counting the number of impulses in a sequence, recording means, displaceable point printing means for printing on said recording means, means for displacing said printing means during counting of said impulses and means controlled by said counting means for actuating said printing means at the end of each said sequence.

(References on following page)

References Cited in the file of this patent

UNITED STATES PATENTS

| | | | |
|---|---|---|---|
| 2,094,983 | Harding | Oct. 5, | 1937 |
| 2,360,883 | Metcalf | Oct. 24, | 1944 |
| 2,440,264 | Grieg | Apr. 27, | 1948 |
| 2,442,098 | Shewell et al. | May 25, | 1948 |
| 2,510,200 | Thompson | June 6, | 1950 |
| 2,624,848 | Hancock et al. | Jan. 6, | 1953 |
| 2,666,807 | Hunt | Jan. 19, | 1954 |
| 2,704,633 | Strother | Mar. 22, | 1955 |
| 2,705,901 | Sherwin | Apr. 12, | 1955 |
| 2,781,970 | Kaufman | Feb. 19, | 1957 |

FOREIGN PATENTS

| | | | |
|---|---|---|---|
| 915,279 | Germany | July 19, | 1954 |